F. BAHLER.
AUTOMOBILE SIGNAL.
APPLICATION FILED MAY 2, 1919.
1,336,713.
Patented Apr. 13, 1920.
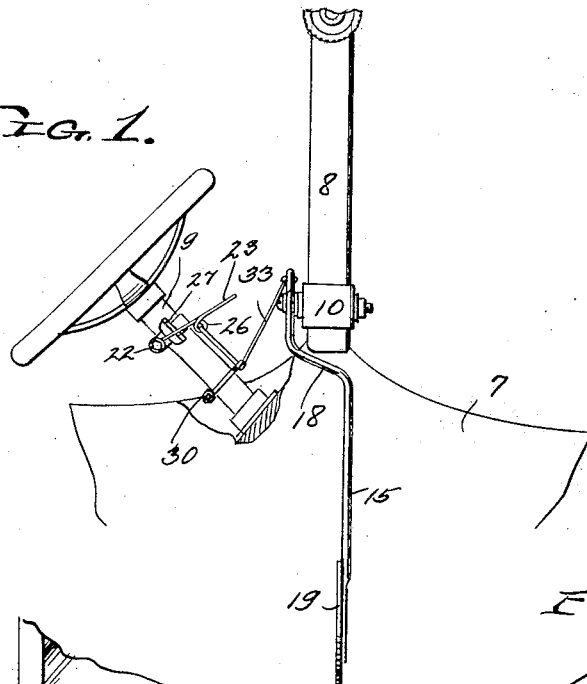
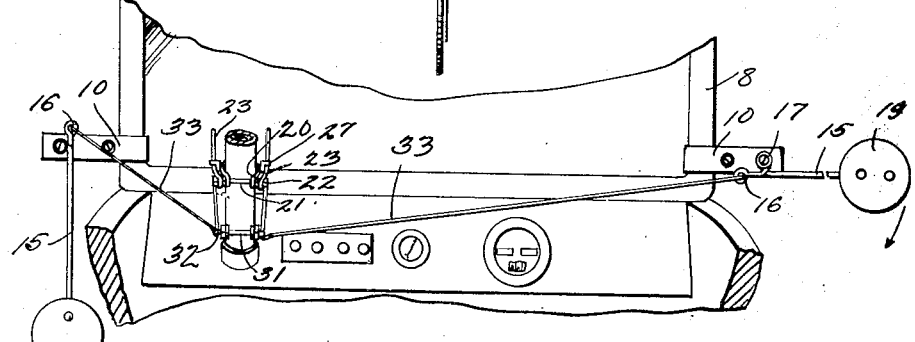
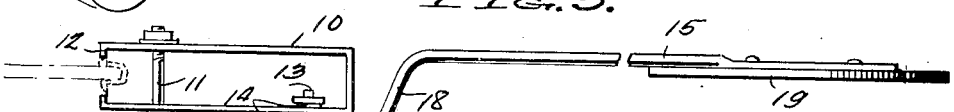
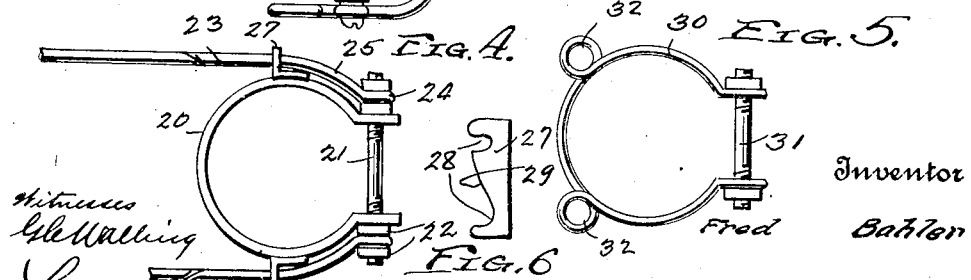
Inventor
Fred Bahler

UNITED STATES PATENT OFFICE.

FRED BAHLER, OF GILROY, CALIFORNIA.

AUTOMOBILE-SIGNAL.

1,336,713. Specification of Letters Patent. Patented Apr. 13, 1920.

Application filed May 2, 1919. Serial No. 294,272.

*To all whom it may concern:*

Be it known that I, FRED BAHLER, a citizen of the United States, residing at Route B, Gilroy, in the county of Santa Clara and State of California, have invented certain new and useful Improvements in Automobile-Signals, of which the following is a specification.

My invention relates to new and useful improvements in automobile signals and more particularly to the type operated by manual power whereby an indicating device is extended upon either side of the vehicle.

An important object of my invention resides in the provision of a device which can be easily applied to any make of automobile.

Another object of my invention resides in the provision of means associated with the steering column of an automobile by which the indicating means on either side of the vehicle is operated.

Another object of my invention resides in the provision of a device of the above mentioned character embodying means associated with the operating means, whereby the indicating means on either side of the vehicle may be securely retained in an operative or inoperative position.

A still further object of my invention resides in the provision of a device of the above mentioned character wherein cables or the like are employed for actuating the indicating means and embodying inexpensive and efficient guide means through which the cables pass.

Another object of my invention resides in the provision of indicating means pivotally mounted upon each side of the vehicle and means whereby the indicating means is prevented from coming in contact with the body of the vehicle to damage the same.

Another object of my invention resides in the provision of a device of the above mentioned character which is strong, durable, inexpensive to manufacture, and is efficient in practice.

Other objects and advantages of my invention will become apparent during the course of the following description.

In the accompanying drawings forming a part of the description and wherein like numerals are employed to designate like parts throughout the same, Figure 1 is a side elevation of an automobile showing the invention applied thereto.

Fig. 2 is a fragmentary view of an automobile showing my invention applied thereto, with one indicating arm in an operative position while the other indicating arm is in an inoperative position.

Fig. 3 is a top plan of the indicating arm and the bracket by which it is mounted upon the automobile.

Fig. 4 is a top plan view of the operating levers and the clamps to which they are pivotally connected.

Fig. 5 is a top plan of the guide means, and

Fig. 6 is a side elevation of the means employed for retaining the operating levers in their two respective positions.

In the drawings, wherein for the purpose of illustration is shown a preferred embodiment of my invention, the numeral 7 indicates a portion of an automobile body, to which is applied a wind shield 8 and the usual steering column 9.

A U-shaped bracket 10, as more clearly shown in Fig. 3 of the drawings, is maintained upon each side of the wind shield to extend transversely of the automobile, by a bolt 11 passing through the parallel arms of the bracket 10 so that the free ends of these arms are brought into close engagement with the wind shield. The terminals of the parallel arms of this bracket extend toward each other as at 12 so that the bracket may be more securely clamped to the wind shield. Adjacent the outer end of the bracket 10, in one of the parallel arms thereof, I provide a bolt 13 upon which is threaded a pair of nuts 14, one nut being arranged upon each side of the arm of the bracket.

This bolt 13 serves to pivot the indicating arm 15 to each bracket. As more clearly shown in Fig. 2 of the drawings, each indicating arm consists of a single strand of wire, the upper end of which is bent to form a loop 16 for a purpose which will hereinafter appear. The portion of each indicating arm, adjacent the loop 16 is bent again into a loop 17, through which the bolt 13 passes to pivot the indicating arm to the bracket 10. The portion 18 of each arm 15 is off set as at 18, whereby the indicating arms may operate in substantially the same plane with the wind shield. An indicating plate 19 of any suitable design or description is secured to the lower end of each indicating arm, and upon which may be inscribed "Right" or "Left", and if desired the indicating arms 15, may be provided with illuminating devices so that the signals may be clearly visible by night.

Referring to Fig. 2 of the drawings, the indicating arm on the left of the figure is shown extending in a vertical position and accordingly is inoperative. The indicating arm on the right of the figure is shown in an operative position and extended in a horizontal plane.

A circular clamp 20 as more clearly shown in Fig. 4 of the drawings, is secured to the steering column 9 immediately below the steering wheel thereof. A bolt 21 passes through the free ends of the clamp 20 to secure it upon the steering column, and as clearly illustrated, both ends of the bolt extend beyond the free ends of the clamp. Each end of the bolt is threaded whereby each extended end of the bolt may receive a pair of nuts 22, one nut of each pair abutting with the free end of the clamp, while the other nut is spaced therefrom for a purpose which will immediately appear hereafter.

The operating means I employ consists of a lever 23 for each indicating arm. Each lever consists of a single strand of wire having one of its free ends bent to form a loop 24, through which the bolt 21 passes, in order that the levers may be pivotally connected to the clamp 20. As stated before, each pair of nuts 22 are spaced apart, and the loop 24 of each lever is received upon the bolt between each pair of nuts in order that the levers may be spaced from the clamp to facilitate easy operation of the levers. The portions 25 of the levers 23 are off set adjacent the loops 24 thereof in order to avoid the clamp 20. As more clearly shown in Fig. 1 of the drawings, each lever is bent intermediate its ends to provide a depending loop 26 for a purpose which will hereinafter appear.

In order that the levers may be held in either of their two positions, that is to say, either to retain the indicating arms in an inoperative position or in an operative position, I provide a pair of plates 27, and these plates are secured to opposite sides of the clamp 20. The plates 27 are in the form of angle plates, so that one arm of each may be secured to the clamp, while the other arm may extend outwardly of the clamp. These angle plates of course extend in a plane parallel to the steering column, and the marginal edge of the arm which extends outwardly of the clamp, is provided with a pair of notches 28, these notches being arranged adjacent the ends of the arm in which they are provided. The portion of the arm, of the plate 27, which is arranged between the notches 28 is inclined as at 29 downwardly toward the lowermost notch 28.

Secured to the steering column at a substantial distance below the clamp 20, I provide a guide clamp 30 which consists of a single strand of wire bent into circular form to snugly embrace the steering column while its free ends are bent into alined loops 31 through which is passed a bolt 32 for securing the clamp to the column. The intermediate portion of the clamp 30 is bent to provide a pair of spaced guide loops 32, one being arranged upon each side of the steering column.

The connections between the levers 23 and the indicating arms 15, are in the form of a pair of cables 33, one end of each being connected to the loops 16 of the indicating arms, while the opposite ends of the cables are connected to the loops 26 of the operating levers. Each cable is of course passed through its respective guide loop 32, so that the cable will correctly swing the indicating arms 15.

When both indicating arms are in their normal position, the operating levers 23 are engaged with the lowermost notch 28 of the plates 27. By swinging the levers 23 upon their pivots, they will ride up the inclined edge of the plates 27 until they are received in the upper notches 28. During this swinging operation of the levers, the cables will of course be drawn taut and exert a downward pull upon the upper ends of the indicating arms, which action will cause the indicating arms to swing outwardly of the vehicle to be arranged in a horizontal plane. Of course, when the indicating arm on the right side of the vehicle is swung outwardly to an operative position, this indicates that the vehicle contemplates making a right hand turn, and vice versa. After the vehicle has made the desired turn, in order to return the indicating arms to their inoperative position, the lever is simply knocked out of the uppermost notch and slides downwardly upon the inclined wall 29 of the plate 27 to engage the lowermost notch 28. The cables 33 are made of such length that when the levers 23 are in their inoperative position and engaging the lowermost notches in the plates 27, the indicating plates 19 of the arms 15 will not strike the side of the vehicle body to damage the same.

The foregoing description and the drawings have reference to what may be considered the preferred, or approved, form of invention. It is to be understood that I may make such changes in construction and arrangement and combination of parts, materials, dimensions, etc., as may prove expedient and fall within the scope of the appended claims.

Having thus fully described my invention what I claim as new and desire to secure by Letters Patent, is:

1. An automobile signal comprising signal means pivoted to an automobile body, levers pivoted to the steering column and movable in a plane parallel to the column, cables connecting said signal means with said levers, a plate secured to said steering column for each lever and being provided with a pair of notches for retaining said levers in an operative and inoperative position, and an inclined wall carried by each plate and arranged between each pair of notches for guiding said levers.

2. An automobile signal comprising a signal pivoted to each side of an automobile, means pivotally connected to the steering column for operating said signals, cables connecting said signals and operating means, and a guide means secured to the steering column and consisting of a single strand of wire having its free ends looped for the reception of a bolt, and a pair of spaced loops formed adjacent the intermediate portion of said wire to receive said cables.

3. An automobile signal comprising an indicating arm pivoted to each side of an automobile wind shield, a clamp secured to the steering column, a bolt passing through the free ends of said clamp for securing it to said column, a lever on each side of said steering column and each lever consisting of a single strand of wire having one of its ends looped for pivotal connection with said bolt, and each lever being further provided with a loop intermediate its ends, and a cable secured to each intermediate loop of said lever and to said indicating arms.

4. An automobile signal comprising signal means mounted upon an automobile body, a vertically operable lever connected to the steering column, cables connecting said signal means with said lever, a notched plate having an upper notch for maintaining said signal means in an indicating position, and said plate having a lower notch to catch the lever when it is removed from the upper notch whereby the signal means may be held in a non-indicating position.

In testimony whereof I affix my signature in presence of two witnesses.

FRED BAHLER.

Witnesses:
JOHN A. REA,
WM. P. ORCUTT.